United States Patent
Odom, Jr.

[11] Patent Number: 5,590,865
[45] Date of Patent: Jan. 7, 1997

[54] TREE STAND FASTENER

[76] Inventor: Harold A. Odom, Jr., P.O. Box 697, Missouri City, Tex. 77549-0697

[21] Appl. No.: 316,794

[22] Filed: Sep. 30, 1994

Related U.S. Application Data

[63] Continuation-in-part of Ser. No. 16,737, Feb. 11, 1993, Pat. No. 5,492,302.

[51] Int. Cl.$^6$ .................................................. F16M 13/00
[52] U.S. Cl. ...................... 248/524; 248/188.7; 248/528
[58] Field of Search ..................................... 248/519, 520, 248/523, 524, 525, 526, 527, 528, 514, 164, 173, 188.7, 431, 163.1; 47/43 R

[56] References Cited

U.S. PATENT DOCUMENTS

| | | | |
|---|---|---|---|
| 650,001 | 5/1900 | Becker et al. | 248/524 |
| 774,497 | 11/1904 | Rompel | 248/523 |
| 1,255,557 | 2/1918 | Norman | 248/516 |
| 1,766,170 | 6/1930 | Goldwood | 248/527 |
| 2,107,638 | 2/1938 | Lyons | 248/523 |
| 2,268,070 | 12/1941 | Geieler | 248/523 |
| 2,500,215 | 3/1950 | Swearingen | 248/524 |
| 2,592,895 | 4/1952 | Harris | 248/523 |
| 2,617,617 | 11/1952 | Krastel et al. | 248/524 X |
| 2,879,019 | 3/1959 | Fox | 248/523 |
| 3,185,416 | 5/1965 | Osinski | 248/527 |
| 4,569,151 | 2/1986 | Hoffbeck | 248/519 X |
| 4,699,347 | 10/1987 | Kuhnley | 248/516 |
| 5,131,618 | 7/1992 | Chapin | 248/523 |
| 5,159,780 | 11/1992 | Molthen | 248/523 X |

*Primary Examiner*—Korie Chan

[57] ABSTRACT

An improved manner for attachment for a tree stand, as for a Christmas tree for holding a tree in a vertical orientation when the stand is assembled and erected. The stand comprises at least three legs, two of which are each longer in length than the remaining legs. The stand is equipped with a central member that provides a mount for receiving the trunk of a Christmas tree. The central member and mount is oriented with respect to the legs so that the connection of the legs to the central member in combination with the lengths of the legs will orient the lower end of each of the legs approximately equidistant from the lower ends of the remaining legs and approximately equidistant from the axis of a Christmas tree installed within the mount. Especially for heavier trees bolts are provided to retain the tree within the mount.

13 Claims, 4 Drawing Sheets

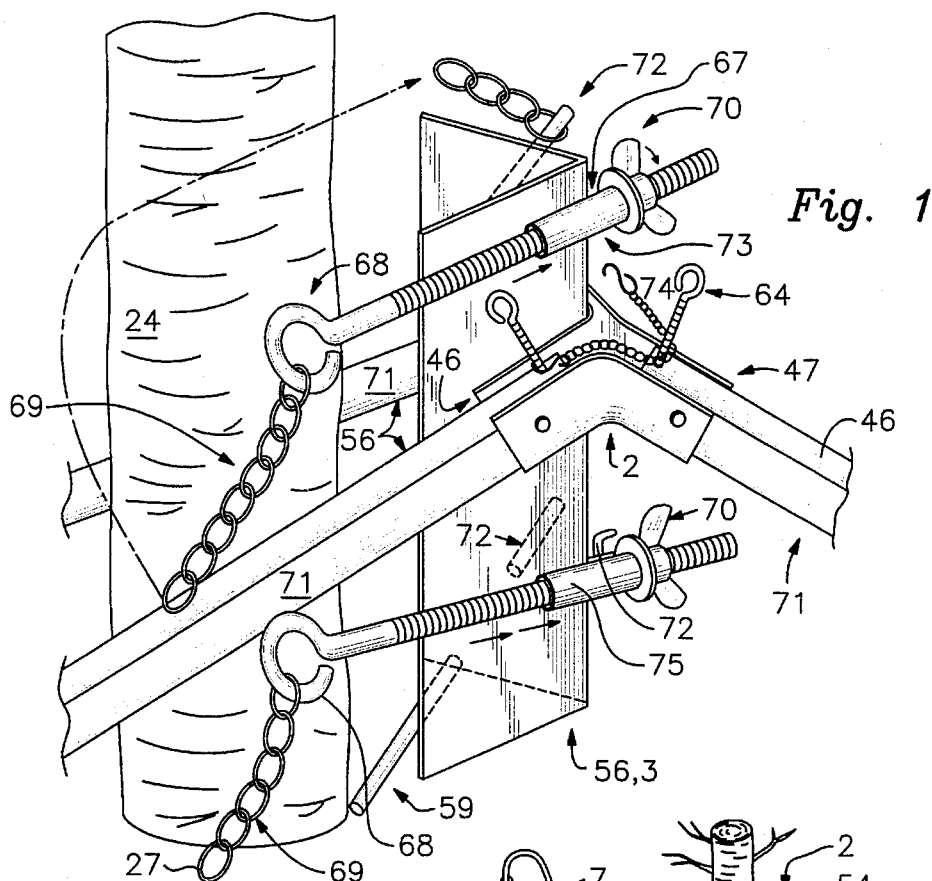
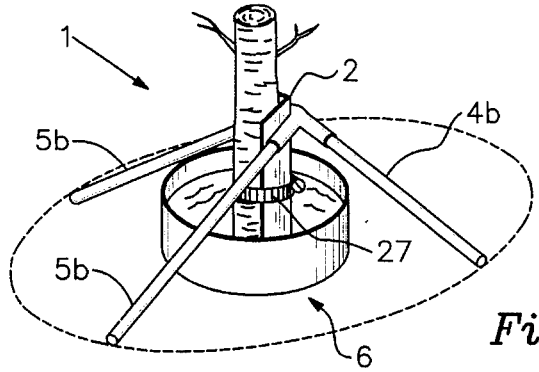
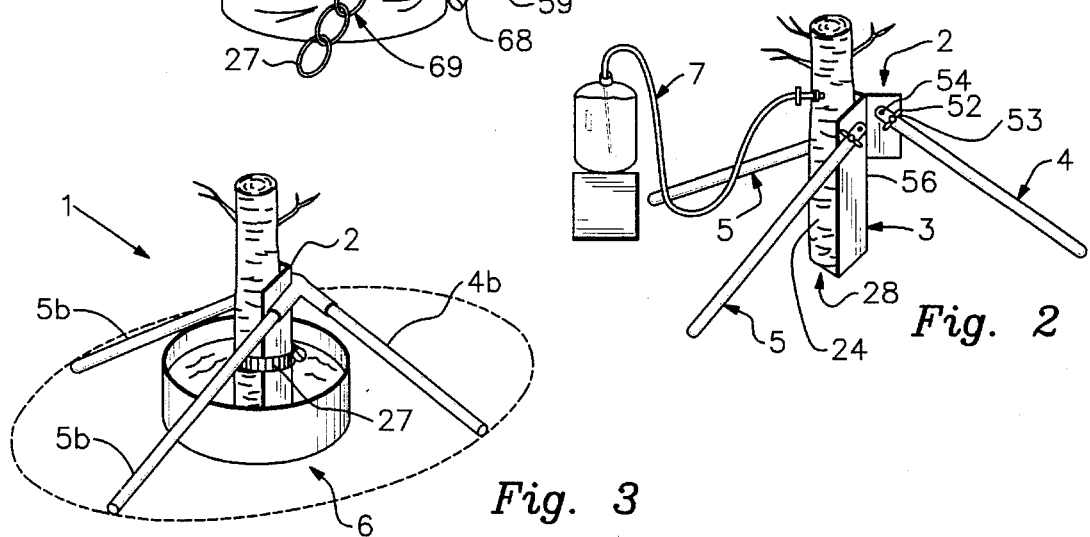
Fig. 1
Fig. 2
Fig. 3

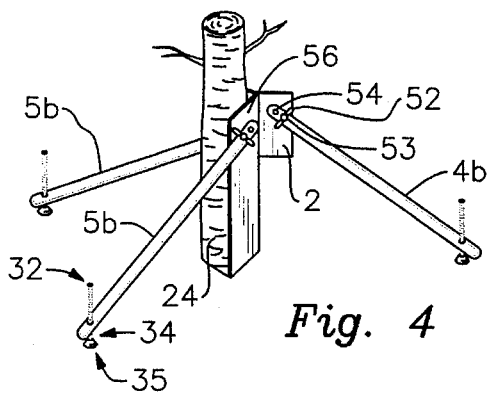
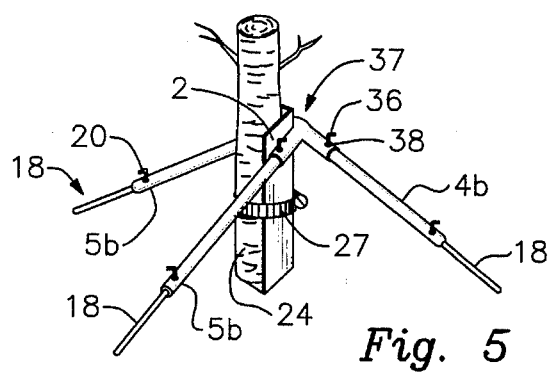
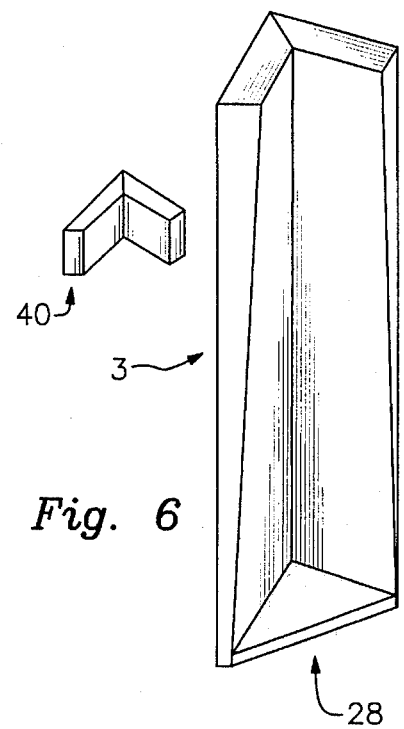
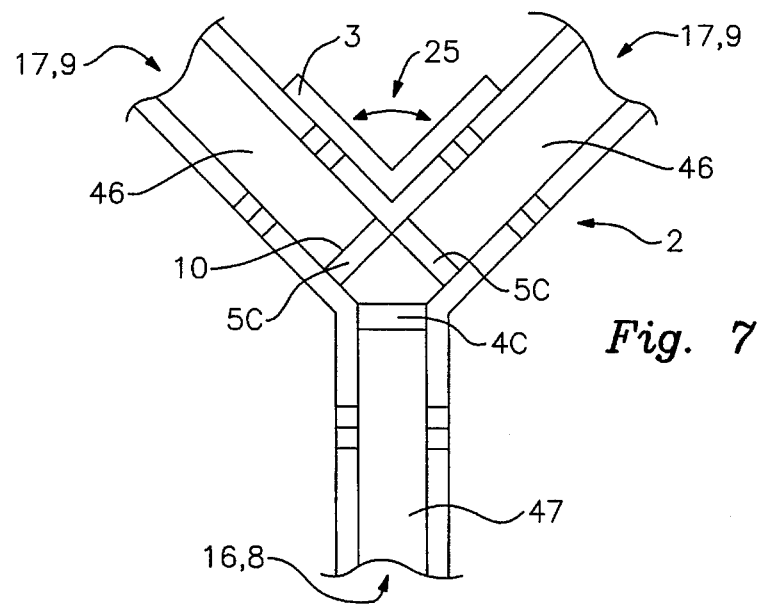

TREE STAND FASTENER

BACKGROUND AND SUMMARY OF INVENTION

This invention relates in general to a device and method for displaying harvested and artifical Christmas trees and the like. More specifically this invention is a continuation in part of prior application Ser. No. 08/016,737 filed Feb. 11, 1995, now U.S. Pat. No. 5,492,302, and relates to an improvement in the manner of securing a tree to the stand. The prior art is replete with examples of methods and apparatus for displaying harvested Christmas trees. The existence of such devices is required to enable users of Christmas trees to properly stand as near vertical as possible and insure that once positioned in such a manner that the tree will most likely remain in such position. This benefit is highly desirable because of the dangers associated with an accidental tipping over, such as the possible breaking of electric light bulbs, the highly combustible nature of Christmas trees when exposed to sources of ignition when light bulbs break and the expense of correcting any damage that could result from any accidental tipping over of the tree, including damage to decorations and spills from reservoirs used to supply water and nutrients.

Various prior art inventions of interest are as follows: U.S. Pat. No. 4,699,347 to Kuhnley, U.S. Pat. No. 4,585,201 to Pursell, U.S. Pat. No. 4,190,983 to Rostomily, and other related art is disclosed in U.S. Pat. Nos. 5,114,113, 5,074,514, 4,894,949, 4,571,882, and 4,477,049, each of which is hereby fully incorporated by reference.

The Kuhnley device is a holder for cut real Christmas trees providing for the display of the Christmas tree from a rounded base with three legs extending there from. The attachment method to the tree is a bracket with straps with ratchets or buckles. From the bracket is a ball which is attached to a foot operated device which relies on the tension created by a spring to hold the ball tightly enough to allow for adjustment of and to retain the position of the tree. The Kuhnley device relies on the tension of a spring to engage the ball from the bracket to hold and keep the tree in a desired position. Loss of tension from the spring and wearing of the ball or socket from use can cause the need for expensive replacement of these parts or the device will not be able to hold the tree as intended. The Kuhnley device does not provide for a means to insure that the cut end of the trunk can be positioned such that it does not interfere with the ability of the stand to successfully sit on the floor in its intended position nor does it insure that the trunk will be immersed into a reservoir far enough such that it can benefit from the water or nutrients contained therein. The Kuhnley device fits down for storage but the requirement of a circular non-folding base requires that the folded size be and remain at least as large as the circumference of the circle onto which the legs attach. This can pose significant limitations on the areas of intended storage by the end user and display areas of any seller of the Kuhnley device.

U.S. Pat. No. 4,585,201 to Pursell, a holder for cut Christmas trees providing for the display of the Christmas tree by use of a tapered post inserted into a tapered drilled hole in the cut end of the Christmas tree. The Pursell device only allows the use of a water reservoir which is impaled on to the tapered post prior to putting the tree on the post which creates the opportunity for leaks around the point of impalement and requires the removal of the water prior to taking the tree down at the end of the season. If the Putsell device is to be reused one must have access to a matching tool to drill the required hole in the trunk or seek a provider of Christmas trees or other persons with a matching tool to drill the required hole in a position such that when installed will reasonably approximate a vertical display.

U.S. Pat. No. 4,190,983 to Rostomily illustrates a severed-tree support device. The Rostomily device uses a movable receptacle for the cut end of the tree in combination with a series of springs and chains to accomplish vertical display. Though the receptacle can be positioned to accommodate crooked trunks, the receptacle does not positively engage the sides of the tree trunk and any attempt to use the receptacle to adjust the displayed tree to a more desired vertical position is totally dependent on the resistance of opposing springs to maintain the position selected. This resistance is minimized as the height and weight of the tree increases. Other related art is disclosed in U.S. Pat. Nos. 5,114,113, 5,074,514, 4,894,949, 4,571,882, and 4,477,049 which are hereby fully incorporated by reference for all they disclose.

DESCRIPTION OF THE DRAWINGS

FIG. 1 Perspective view of the primary embodiment of the invention with a detail of the central member and alignment adjusters FIG. 2 Perspective view of alternative embodiment of the invention FIG. 3 Perspective view of alternative embodiment of the invention FIG. 4 Perspective view of alternative embodiment of the invention FIG. 5 Perspective view of alternative embodiment of the invention FIG. 6 Detail of angle bracket of central member FIG. 7 Plan view of central connection member of primary embodiment FIG. 8 Perspective view of alternative fasteners of the present invention FIG. 9 Perspective view of another alternative embodiment of the invention with band clamp means.

SUMMARY OF THE INVENTION

Figure 8:
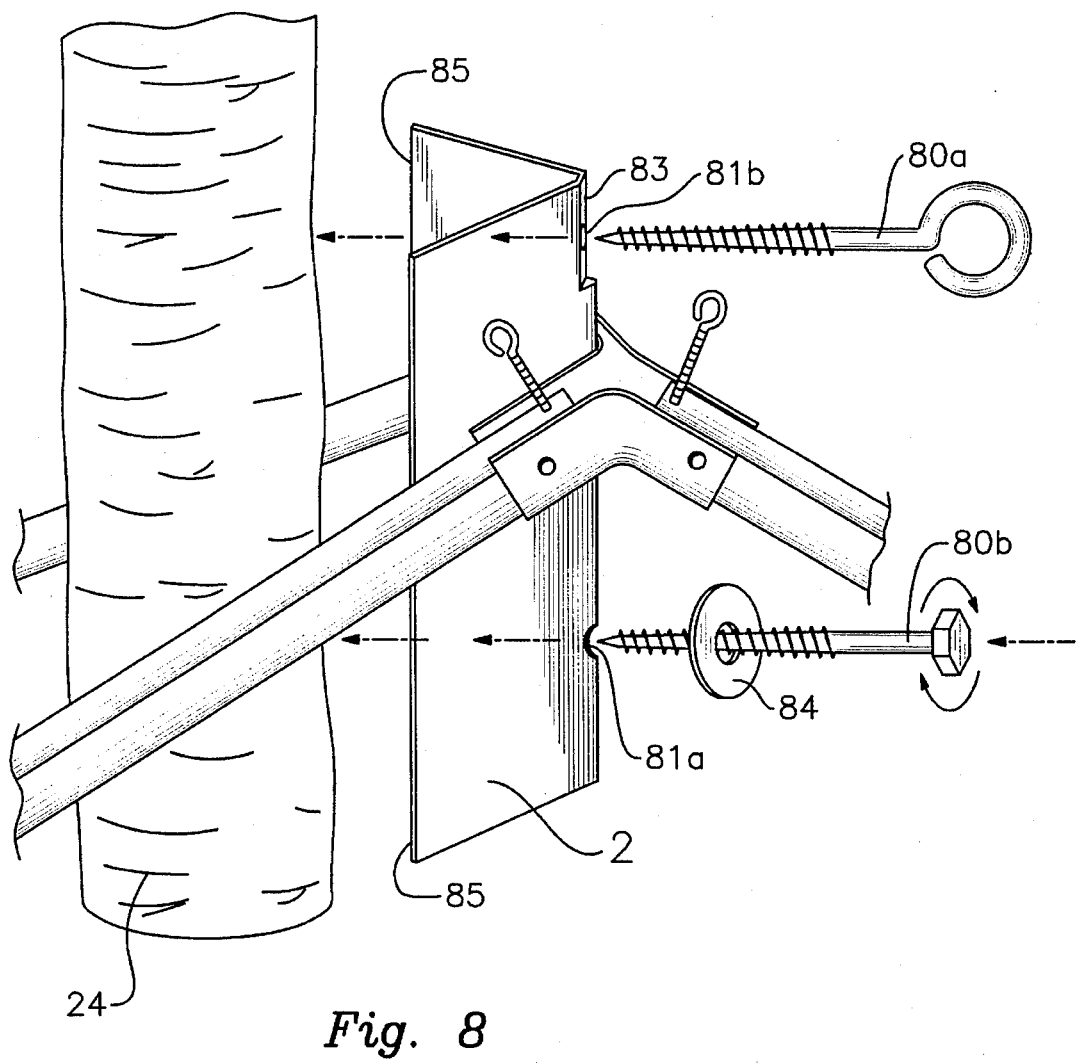

The focus of the present invention is to provide a new and improved method for erecting and displaying harvested and artifical Christmas trees and the like. The present invention will be discussed from the respective of a first embodiment with hinging legs and alternative embodiments both with and without hinging legs, all apparatus forming the support for a Christmas tree when attached thereto. Different reference numberals for analogous components of the various embodiments are referenced on the illustrations.

The following embodiments of the present invention describe a much improved display device which allows a stable display method with significantly increased water supply from a reservoir without the requirement to compromise the integrity of the reservoir by puncturing it to attach it to a stand. The only tool required by the invention is a screwdriver and all pain are inexpensive to manufacture and reusable tier an indefinite period of time. The present invention provides a system whereby the attachment points are determined without regard to the availability of branches sufficiently strong to withstand the tension necessary to secure trees of various sizes to the base members. Since great care is taken in the growing and shaping of the Christmas tree to present as uniform of an appearance as possible an additional benefit is that there is no unwanted re-positioning of the branches by the downward bending caused by the forces from any attachment method using the branches as a connection point.

A further advantage of the present invention is that the tree is firmly and securely attached to the invention and does not rely on ball socket and other swivel means at the point of attachment to attempt to adjust the tree to vertical.

The present invention achieves vertical alignment adjustment by changing the angles of the legs to the floor through either the use of adjustment screws that independently alter the respective angles of each leg to the central member and to the floor. Alternative adjusters are: a leveling bolt on each leg which when extended through the leg cause the leg to raise up thereby changing the angle of the leg to the floor and consequently the vertical relation of any Christmas tree held by the present invention; or the use of shims on either end; or by extending and locking the length of the legs; or by raising the tips of the legs by adjustable elevation means; or by the use of shims between the tree trunk and the invention. A further advantage of the present invention is that once the necessary tension is applied to position the tree in the desired location it is extremely difficult to accidentally remove the tension.

A further advantage of the present invention is that since the tree trunk is held in place principally by the tension applied by the bracket fastener, the need to have a special tool to install an upward tapered bore in the cut end of the tree trunk solely for the purpose of providing a receptacle for a support shank of some type is eliminated providing a greater number of users with the opportunity to enjoy the benefits of the present invention without the need to have special tools or to continually seek out other means of providing a necessary bore.

The transporting and handling of the tree once a display device of any type is affixed necessarily requires that the device connections receive a significant amount of stress. The stress can splinter wood braces where nailed to the tree trunk or stand and cause rope and other materials with any elasticity to loosen or to allow the springs or the like to permit the stress caused by the weight of the tree to be placed directly onto the spike or other type post which penetrates the cut end of the trunks the primary means of holding the tree vertically.

As opposed to devices with wooden braces, chains and springs or flexible materials attached at angles to the trunk, a further advantage of the present invention is that it is fastened such that the lateral torque pressures are eliminated. A further advantage of the present invention is that the interference and potential for leaks of an upward tapered bore with the successful employment of a system which supplies water and nutrients "intravenously" to the tree's capillary system through tubing connected to the side of the trunk is eliminated. Such a system is described and claimed in U.S. Pat. No. 5,016,389 by the same inventor, and is hereby fully incorporated by reference for all that it discloses. A further advantage of the present invention is that a wide selection and variety of readily available and adaptable large capacity reservoirs used for water and nutrients can be used in combination with the device if desired.

A further advantage of the present invention is the use of a flexible worm-gear band clamp, a tensioning chain clamp to cinch and adjust, or alternatively one or more lag screws to secure, a wide variety of tree diameters as opposed to the use of U-bolts or other fixed width means which would limit their use to trees with diameters less than the width of the U-bolt or other means. A further advantage of the present invention is that the hinging or removal of the legs allows liar easy and quick storage of the tree stand in a size and shape which is significantly smaller than the size and shape when attached to the tree.

A further advantage of the present invention is that the tree can quickly and easily be adjusted to vertical in any direction by the use of leveling devices to change the angles of the legs to the floor.

The present invention is a tree stand which comprises a bracket attached to or formed integral with a (plan view) "Y" shaped central connection member with 3 bosses forming flanged or recessed pockets for the connection (and optional hinged firing) of at least three legs which may be of adjustable length. The invention is configured so that the end of each leg opposite from the central member will rest approximately equidistant from each of the other two legs on the floor when the stand is erected, forming a tripod with the central connection member offset from the center, but with the tree bracket and tree trunk approximately centered relative to the tripod leg ends and approximately vertical. The invention further comprises one or more adjustable attachments for securing a tree to the bracket. The invention can be further fired with apparatus or shims for use at either or both ends of the legs for adjustment of a tree to vertical. The above listed advantages are not exhaustive but are illustrative only. Others will be apparent to those skilled in the art.

DETAILED DESCRIPTION OF THE PREFERRED EMBODIMENT

With reference now to the drawings the new and improved apparatus of the present invention will be described. For illustrative purpose specific dimensions and materials are listed, but the invention is not considered to be so limited. As best shown in FIGS. 2 through 5 the present invention is based on a concept of a tripod whose leg tips rest approximately equidistant on the circumference of an imaginary circle approximately 36 inches in diameter. The apex where the legs meet has been moved back from the center of the circle to allow a Christmas tree to be attached and rest in the approximate center of the 36 inch circle. The moving of the apex from center causes the lengths of the legs to change from 3 legs of equal length to two legs of 1' 9⅜" and one leg of 1' 3¾". This movement also causes angles between the legs to change from 120 degrees each when the apex was in the center to one angle of 100 degrees 8 minutes 10 seconds and two angles of 129 degrees 55 minutes 55 seconds. When one end of each leg of the length described above is placed approximately equidistant from each other on the circumference of a 36 inch circle the other ends of the legs intersects at a point which is approximately 9 inches above the floor creating the necessary clearance for the end of a tree trunk attached to the invention to not touch the floor yet extend downward enough tier the placement of a reservoir between the legs tips on the floor thereby making water or nutrients in the reservoir available to the tree. FIG. 3.

For larger sized trees, the configuration can be proportionally enlarged to have the ends of the legs rest on a circle approximately six feet in diameter. Other components can be proportionally selected tier handling the larger trees also, such as substituting a heavy wall tube tier legs 71, and using larger bolts and hardware. For example ⁵⁄₁₆ inch instead of ¼ inch.

In this respect the Apparatus 1 shown in FIGS. 1 through 5 comprises a central connection point shown in detail in FIGS. 1 and 7. The central connection point, central member 2 in FIG. 1 is a (plan view) "Y" shaped unit with three bosses projecting and defining the "Y" and with a portion of each boss left out during a casting process to form a pair of flanges or drilled or left out to from a pocket at each boss or set of flanges.

FIG. 1 shows an embodiment of the invention which utilizes hollow ⅜" square steel legs 71. Each leg is fitted with a leveler 64 which is an eye bolt and nut 65 on the end nearest the apex of the legs 71. The threading of the leveler 64 through the nut 65 so that the threaded end rest on the retaining surface 4c, 5c as shown in FIG. 7 and the further turning of the leveler 64 on either leg 71 causes the angle of that leg 71 to the floor to increase or decrease thereby changing the vertical position of the bracket 56 and any tree trunk 24 secured therein. FIG. 1 shows the use of an optional metal chain 74 and "S" hooks 73 to connect and encircle the three eye bolts 64 and causes the legs to be prevented from returning to the folded position when installation on a tree 24 and the tilting up of the same is desired. The cinch type fastener 27 shown in FIG. 1 utilizes a like type chain 69 which connects to an eye bolt 68. The threaded end of the eye bolt 68 passes through a stationary guide 75 equipped with hook 72 then a wingnut 70 is threaded onto the eye bolt 68. A link of the chain 69 is attached to the hook 72. The chain 69 can encircle the trunk 24 and attach to the hook 72. A clockwise turning of the wingnut 70 causes the chain 69 to gain tension and thereby secure any tree trunk 24 between it and the angle bracket 56 in the desired manner.

FIG. 1 shows the bottom of the angle bracket 56 fitted with a lip or bolt 59 as a retaining shelf to receive and position the butt of the tree trunk 24 so that when the legs 4b, 5b of FIG. 5 are fully extended, the butt of the tree trunk 24 will clear the floor above the points where the legs 4b, 5b rest and will be tar enough down such that as shown in FIG. 3, the device 1 and a tree trunk 24 can be partially tipped over and a reservoir 6 of water or nutrients can be placed under the butt of the tree trunk 24 and when the device 1 is returned to a position so that all legs 4b, 5b rest on the floor, the butt of the tree trunk 24 extends well into the reservoir 6 so that the tree trunk 24 can have access to the water or nutrients in the reservoir 6.

FIGS. 1 through 5 and 7 all show leg connections points spaced such that the angle between the center lines of the two of the connection points for the two longer legs is 100 degrees eight minutes and ten seconds. The third connection point is placed so that it's center line intersects the point where the center line of the first and second connection points meets thereby creating equal angles of 129 degrees 55 minutes 55 seconds to the center lines of each of the first and second connection points. The central member 2 may be formed from a casting process of aluminum with two pockets for long legs 17 and one pocket tier a short leg 16 each approximately 4 inches in length from the point where they intersect, formed by leaving out during the casting process or alternatively drilling out the central portion of the bosses.

In the case of hinged legs as shown in FIGS. 1, 2, 4 and 7 the two long legs 5B, are attached to the pocket for long legs 9 such that they hinge and intersect a flat, 5c, FIG. 7, which will be oriented when the stand is set up, inside the pocket at an angle of sixty five degrees thirteen minutes and fourteen seconds to vertical. The short leg 4b, shown in FIG. 1, 2 and 4, hinges and intersects a flat 4c inside the pocket for a short leg 8, which will be oriented when the stand is set up, at an angle of fifty-five degrees forty-eight minutes and fifty seconds to vertical.

The central member of FIGS. 1 and 7 is plan view "Y" shape and may alternatively be formed from a casting molding or machining process of aluminum, steel, synthetics or any other suitable material, and is provided with three bosses approximately three inches long with a portion of the bosses left out during the casting process to accommodate legs or the material and size and shape selected.

In the case of hinged legs 4 and 5 as shown in FIGS. 1 and 7, the three legs may be attached to the central member by ¼" roll pins inserted through matching ¼" holes in each flange of the pocket 8, 9, and 46, 47 and a matching ¼" hole in each leg 4, 5 located so that when fully assembled each leg 4, 5 can hinge and come to rest against the flat of pocket 8, 9 or hinge and come to rest within the recessed area of the pocket 46, 47. When fully hinged one end of each long leg 5 rests on the floor and the other end rests on a section inside the flanged pocket 46 or against a flat in flanged pocket 9 which causes the long legs 5 to be at an angle of twenty-four degrees forty-six minutes and forty-six seconds to horizontal. When fully hinged one end of the short leg rests on the floor and the other end rests on a section inside the flanged pocket 47 or against a flat in flanged pocket 8 which cause the short leg to be at an angle of thirty-four degrees eleven minutes and eleven seconds to horizontal. A portion of the outer end of each flange 8,9 and 46,47 has been left out to allow the legs 4, 5 to hinge and fold down parallel to the central member 2. In the case of hinged legs 4b and 5b as shown in FIGS. 2 and 4, the three legs may alternately be attached to the angle bracket 56 by placing the threaded stud 53 through the second ¼" hole or legs 4, 5 and turning a wingnut 52 clockwise to engage the first ¼" of the threaded end of the stud 53. The leg 4b or 5b is then lifted until it touches the underside of the wingnut 52 on the threaded stud 53 and rotated until it aligns with and is lowered to receive the full opening stud 54. The wingnut 52 is turned clockwise until it engages the side of the leg 4b or 5b thereby retaining the leg on the full opening stud 54 in its intended position relative to the floor and the central member. When fully hinged and locked the long legs 5b will be at an angle of twenty-four degrees forty-six minutes and forty-six seconds to horizontal and the short leg 4b will be at an angle of thirty-four degrees eleven minutes and eleven seconds to horizontal. In all embodiments, when fully assembled and fully hinged where provided, the tips of the legs will rest approximately equidistant from each other on an imaginary 36 inch circle and the apex where the legs meet will be approximately 9 inches off the floor and the central member 2 will be approximately vertical.

As shown in FIGS. 1 through 6, the central member 2 is so cast, or a portion of the material of the central member 2 between the two longer flanged pockets 9, 17 has been removed to from a recessed angle 25 which runs the entire length of the central member 2. Alternatively as in FIGS. 6 and 7 an angle iron 3 or suitable dimensions can be bolted welded or otherwise attached to the central member 2. FIG. 6 shows a cast aluminum central member angle bracket 3, 2"×2" 9" long with a thickness starting at ¼" at the lower portion where the recessed lip 28 is situated, square on the outside and graduating evenly to a thickness of ⅜" at the inside top which is formed in the casting process or separately provided and attachable to the central member 2 by welding or screw means. The upward tapering of the bracket 3 or the bracket portion of the central member 2 is provided to reduce the amount of adjustment of the tree trunk to vertical by accommodating the natural changes in the diameter of tree trunks from the bottom up. There is provided for optional use a positioning wedge 40, which is ¼" thick, one inch high and four inches in length. When the positioning wedge 40 is inserted between the tree trunk 24 and the bracket 3 at selected points along the height of the bracket 3 it will provide additional adjustment for changes in tree trunk diameter more extreme than allowed for in the bracket 3. The bracket 3 is suitable for partially engaging tree trunks 24 of varying diameters with the lower end of the bracket 3 optionally fitted with a retainer lip 28 FIG. 6 or retaining nut and bolt 59, FIG. 1, to provide a means to insure that the tree trunk 24 does not extend beyond the point where the legs will rest on the floor when the tripod is fully extended. When the tree is placed in the present invention, as shown in FIGS. 1 through 5 it fits into the just described bracket 3 or in angle bracket 56 and is secured by one or more cinch type fasteners 27. When the invention is in an upright position with a tree trunk attached it allows the insertion of shim material between the end of the leg 4, 5 and the flat inside the flanged pockets 8, 9 of FIG. 2 or between the side of the leg 4, 5 and the angled section of the flanged pockets 46, 47 of FIG. 7.

As shown in FIGS. 1 and 7, the inner face of each flanged pocket 8, 9 is provided with a flat vertical surface 10 against which the end of the legs 4a and 5a will rest when fully hinged. The flat surfaces 4c, 5c allow for shim material to be inserted between the end of the leg 4a, 4b and the flat surface of the flanged pockets to assist in adjusting the position of the tree trunk by altering the angle between the leg and the floor and correspondingly moving the tree trunk 24 into a more desired position.

As shown in FIG. 1 the ends of each leg 4, 5 nearest the central member can be fitted with a nut 65 formed, welded or attached by clip means to the top or bottom of the leg 4, 5 or 71 and positioned so that when an eye bolt 64 is threaded through the nut 65 it will lengthen and as it does, engage the retaining surfaces 4c, 5c thereby changing the angle of one or more of the legs 4, 5 allowing any tree trunk 24 to be adjusted to vertical.

in the case of an apparatus with legs which do not hinge and fold, FIGS. 3 and 5 show connection points 16, 17 drilled or molded with a hole three inches in depth and 0.84" in diameter to receive the ends of the legs 4, 5. The end of the connection points 16, 17 may be fitted with a set screw and matching threaded hole to provide a means of extending and locking the legs 4 and 5 to adjust the tree to vertical. The lengths of each leg 4, 5 as previously described and the angles at which the recessed long and short leg pockets 16 and 17 intersect the central member or the angle 4a, 4b that the ends of the legs 4, 5 are cut to is such that when the legs 4, 5 are attached at the connection points, the tip of each leg 4 and 5 rests approximately equidistant from one another and on the circumference of a 36 inch circle 26 and the apex where the legs meet is moved off from center of the circle such that then the weight of the tree trunk 24 or mast attached to the central member 2, 11, or 15 can rest in the approximate center of the circle 26 onto which the legs now rest.

The use of one or more flexible metal worm gear type hose clamps, as in FIGS. 3 and 5, adjustable to a wide range of diameters, easy to procure and replace, provides a cinch type fastener 27 to tighten around the tree trunks 24 of varying diameters and the central member bracket 3 thereby causing 10 the tree trunk 24 to be securely pressed against the central member bracket 3, limiting any type of movement of the tree trunk 24. FIGS. 3, 5. Alternatively, the use of one or more lengths of chain attached on one end to a fixed point 72 on the bracket 56 or attached to the tensioning bracket 74 hook 76 and attached to a threaded eye bolt 68 which has been inserted through a stationary guide 75 as shown in FIG. 1 and described previously.

Further, the central member bracket 3, and angle bracket 56 have an optional retainer 28 at the bottom most part to receive and position the butt of the tree trunk 24 so that when the legs 4, 5 are fully extended, the butt of the tree trunk 24 will be in the proper position to clear the floor above the points where the legs rest on the circle 26 and be far enough down such that as shown in FIG. 3, the device 1 and tree trunk 24 can be partially tipped over and a reservoir 6 of water or nutrients can be placed under the butt of the tree trunk 24 and when the device 1 is returned to a position so that all legs rest on the floor, the butt of the tree trunk 24 extends well into the reservoir 6 so that the tree trunk 24 can have access to the water or nutrients in the reservoir 6. The cinch type fastener 27 is sized or provided in numbers such that sufficient tension can be applied and retained until it is desirable for the user to relieve the tension and remove the device 1. This type fastener is easily adjustable, can be placed along the bracket 3 clear of branches. The cinch type fastener 27 is easily adjustable to fit and hold securely a wide range of tree trunk 24 diameters and can be opened and fitted around any point of the cut end of the trunk 24.

Alternatively especially suitable for much larger and heavier trees an improved method of securing such trees is illustrated in FIG. 8. Angle bracket 2 is as previously described and one or more lag bolts 80 are screwed into the tree trunk 24. The bolts 80 can be either hex headed 80b or eye bolls 80a, or the equivalent. Sufficient holes 81 are provided in the bracket 2. The holes can be directly through the angle as at 81a or can also be configured through a flat 83 in the angle 2. In an alternative washers 84 can be used with any above described configuration or any equivalent.

The bracket 2 is placed on the lower side of the tree trunk 24 and the bolt 80 enters through hole 81 in the back of the angle bracket which is large enough to allow the shank of the bolt to pass but small enough to stop the head or eye loop and allow the head or eye loop to turn against the back of the angle bracket or a washer. The threads will be self tapping as with lag type bolts which can be easily sized to secure the size of tree desired.

Figure 9:
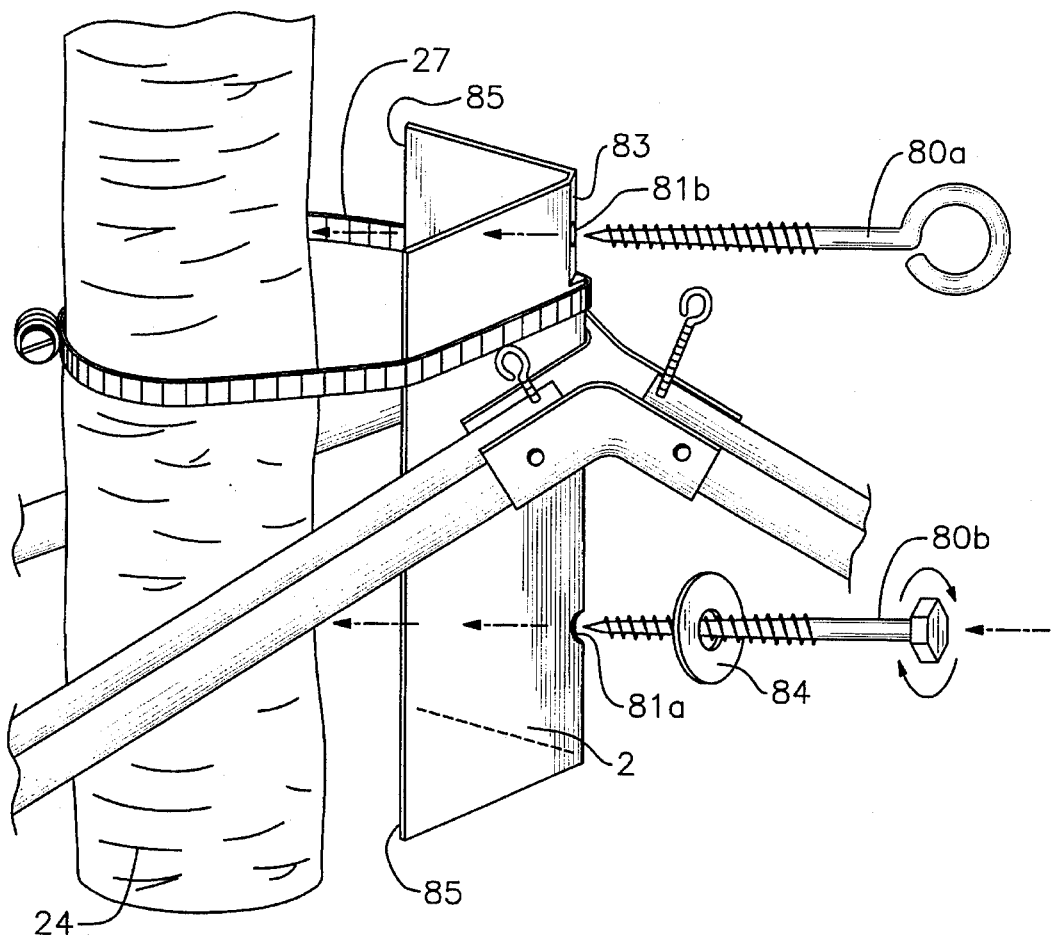

The bolt or bolts 80 also function equivalent to the shelf or lip previously described to hold the tree up as well as the securing means for holding the tree to the stand. This bolt configuration is most suitable to larger heavier trees as with bands straps or u-bolts the bark on the tree has a tendency to strip or crush under the strain. In contrast the bolts 80 draw the trunk 24 against the entire length of the edges 85 of the bracket 2 so that the edges "bite" into the trunk securely. The bolts can also be used in combination with the cinch type fasteners 27. FIGS. 1, 3, 9.

FIG. 5 shows the ends of each leg 4, 5 fitted so as to receive an adjustable extension member 18 to facilitate the adjustment of the tree to the desired vertical position.

As shown in FIG. 4 the ends of each leg 4, 5 alternately can be fitted with a threaded steel rod 32 with a ball 33 one inch thick formed or welded to one end. The rod 32 of FIG. 4 is then threaded through each leg 4, 5 by means of a matching threads 34 until the ball 33 rests against the underside of the legs 4, 5 placing the leveling device 35 in a fully retracted position which will cause the device 1 to be vertical. Any tree trunk 24 placed in the device 1 can be adjusted to a more desired position by turning clockwise the leveling device 35 of FIG. 4 on any leg which changes the angle of the leg to the floor and causes the bracket 3 and thereby the tree trunk 24 to be moved to a new position.

The legs can be square or round and can be attached in a fixed manner at the recessed long leg and short leg pockets 16, 17 shown in FIGS. 3 and 5 or preferably can be hinged at the flanged pockets 8, 9 shown in FIG. 1,2,4, or 7. As to the manner of operation and use of the present invention, the same is made apparent from the foregoing discussion. With respect to the above description, it is to be realized that although dimensional embodiments of specific materials is disclosed, these enabling embodiments are illustrative, and the optimum dimension relationships tier the parts of the invention are to include variations in size, materials, shape, form, function and manner of operation, assembly and use, which are deemed readily apparent to one skilled in the art in view of this disclosure, and all equivalent relationships to those illustrated in the drawings and encompassed in the specifications are intended to be encompassed by the present invention.

Therefore, the foregoing is considered as illustrative of the principles of the invention and since numerous modifications will readily occur to those skilled in the art, it is not desired to limit the invention to the exact construction and operation shown or described, and all suitable modifications and equivalents may be resorted to, falling within the scope of the invention. What is claimed as being new and desired to be protected by letters patent is as follows:

In the claims:

1. A tree stand, as for a Christmas tree, adapted for assembly and disassembly and for adjustment to hold said tree in a vertical orientation when assembled and erected, said stand comprising:

(a) at least three legs, wherein two of said legs are each longer in length than said remaining legs;

(b) a central member comprising means for receiving the trunk of said Christmas tree, and interconnection means for the connection of the first end of each of said legs to said central member, wherein said interconnection means in combination with the lengths of said legs will orient the second ends of each of said legs approximately equidistant from each other and will orient the second ends of each of said legs approximately equidistant from the axis of the Christmas tree installed within said receiving means;

(c) adjustment means for changing the angle of at least one of said legs relative to the ground, thereby changing the orientation of the axis of the Christmas tree; and, (d) at least one adjustable securing means for holding said Christmas tree within said receiving means comprising holes through the central member and threaded bolt means which pass through said holes and into said tree trunk to secure said tree.

2. The invention of claim 1 wherein there are three legs and two of said legs are of equal length and said two legs are both longer than said third leg.

3. The invention of claim 1 wherein there are three legs and said central connection member comprises an offset apex connecting said three legs.

4. The invention of claim 1 wherein said interconnection means of said central member further comprises hinge means connecting said first ends of said legs to said central member for folding and opening of said stand legs.

5. The invention of claim 1 wherein said interconnection means of said central member comprises receptacle pocket means and retaining means for receiving and retaining said stand legs.

6. The invention of claim 1 wherein said central connection member comprises an outlet apex connected to said stand legs and wherein said trunk receiving means is centered approximately equidistant from said second ends of each of said legs.

7. The invention of claim 1 wherein said trunk receiving means comprises an angled recess comprising at least two faces formed in said central member, said recess running along the length of said central member located intermediate said two longest of said legs.

8. The invention of claim 7 wherein said angled recess laces taper upwardly to more closely conform to the upward taper of a tree trunk.

9. The invention of claim 7 wherein said trunk receiving means further comprises shelf means for supporting the butt end of said Christmas tree.

10. The invention of claim 8 wherein said trunk receiving means further comprises shelf means for supporting the butt end of said Christmas tree.

11. The invention of claim 1 wherein said adjustable securing means comprises band clamp means comprising worm screw adjustment means for tightening and loosening said band clamp means.

12. The invention of claim 1 wherein said adjustable securing means comprises a chain cinch means comprising threaded bolt adjustment to tighten and loosen said chain cinch means.

13. The invention of claim 1 wherein said adjustment means comprises leg adjustment screw means acting upon said central member to change the angular relationship of at least one of said leg means and said central member.

* * * * *